US008130425B2

(12) United States Patent
Jackson (10) Patent No.: US 8,130,425 B2
(45) Date of Patent: Mar. 6, 2012

(54) METHODS AND APPARATUS TO ROUTE FAX CALLS IN AN INTERNET PROTOCOL (IP) MULTIMEDIA SUBSYSTEM (IMS) NETWORK

(75) Inventor: James Jackson, Austin, TX (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 1166 days.

(21) Appl. No.: 11/925,454

(22) Filed: Oct. 26, 2007

(65) Prior Publication Data

US 2009/0109495 A1     Apr. 30, 2009

(51) Int. Cl.
    *H04N 1/42* (2006.01)
(52) U.S. Cl. ....... 358/476; 358/402; 358/1.15; 358/438; 709/238; 709/227; 379/88.17; 379/88.13; 370/493; 370/352
(58) Field of Classification Search .................. 358/438, 358/402, 1.15, 400, 403, 476; 709/238, 228, 709/227, 206; 379/88.17, 93.01, 88.13, 211.02, 379/88.18; 370/493, 352, 230, 401, 353
    See application file for complete search history.

(56) References Cited

U.S. PATENT DOCUMENTS

| | | | | |
|---|---|---|---|---|
| 5,467,434 A * | 11/1995 | Hower et al. ................. | 358/1.15 |
| 5,999,525 A * | 12/1999 | Krishnaswamy et al. .... | 370/352 |
| 6,233,318 B1 | 5/2001 | Picard et al. | |
| 6,392,760 B1 * | 5/2002 | Ahuja et al. .................. | 358/400 |
| 6,463,053 B1 | 10/2002 | Chen | |
| 6,529,500 B1 | 3/2003 | Pandharipande | |
| 6,625,258 B1 | 9/2003 | Ram et al. | |
| 6,744,761 B1 | 6/2004 | Neumann et al. | |
| 7,161,933 B2 | 1/2007 | Stanford | |
| 7,181,514 B2 | 2/2007 | Saito | |
| 7,231,027 B2 * | 6/2007 | Schmid et al. ................. | 379/189 |
| 7,692,810 B2 * | 4/2010 | Ueda et al. .................... | 358/1.15 |
| 7,791,748 B2 * | 9/2010 | Izumi et al. ................... | 358/1.15 |
| 7,796,285 B2 * | 9/2010 | Robbins ........................ | 358/1.15 |
| 7,894,091 B2 * | 2/2011 | Fujino .......................... | 358/1.15 |
| 2002/0064149 A1 * | 5/2002 | Elliott et al. ................... | 370/352 |
| 2003/0126540 A1 * | 7/2003 | Lee et al. ....................... | 714/774 |
| 2003/0164986 A1 | 9/2003 | Boire-Lavigne et al. | |
| 2003/0193696 A1 * | 10/2003 | Walker et al. ................. | 358/402 |
| 2004/0003114 A1 | 1/2004 | Adamczyk | |
| 2005/0036167 A1 * | 2/2005 | Atsumi ......................... | 358/1.15 |
| 2005/0068980 A1 * | 3/2005 | Mathew et al. ............... | 370/464 |
| 2005/0117183 A1 * | 6/2005 | Adlakha et al. ............... | 358/402 |
| 2005/0220082 A1 * | 10/2005 | Toyoda .......................... | 370/352 |
| 2006/0018311 A1 | 1/2006 | Kobayashi et al. | |

(Continued)

OTHER PUBLICATIONS

Enumservice Registrations, Internet Article, http://www.iana.org/assignments/enum-services, Mar. 4, 2004, 9 pages.

(Continued)

*Primary Examiner* — Negussie Worku
(74) *Attorney, Agent, or Firm* — Hanley, Flight & Zimmerman, LLC (57) ABSTRACT

Methods and apparatus to route fax calls in an Internet protocol (IP) multimedia subsystem (IMS) network are disclosed. An example method comprises receiving a message including a called party number and a media description at an IMS network and determining if the media description is associated with a fax protocol. Additionally, when the media description is associated with a fax protocol, the example method attempts to locate a fax-specific uniform resource identifier (URI) associated with the called party number.

24 Claims, 7 Drawing Sheets

U.S. PATENT DOCUMENTS

| | | | |
|---|---|---|---|
| 2006/0034188 A1* | 2/2006 | Oran et al. | 370/254 |
| 2006/0098621 A1 | 5/2006 | Plata Andres et al. | |
| 2006/0153242 A1* | 7/2006 | Krause et al. | 370/493 |
| 2006/0184676 A1* | 8/2006 | Tanimoto | 709/227 |
| 2007/0005653 A1* | 1/2007 | Marsh | 707/104.1 |
| 2007/0043829 A1 | 2/2007 | Dua | |
| 2007/0072632 A1* | 3/2007 | Alanara et al. | 455/466 |
| 2007/0091892 A1* | 4/2007 | Bouchard et al. | 370/392 |
| 2007/0104184 A1 | 5/2007 | Ku et al. | |
| 2007/0189266 A1* | 8/2007 | Izumi et al. | 370/352 |
| 2009/0073499 A1* | 3/2009 | Glunz | 358/400 |
| 2010/0259788 A1* | 10/2010 | Sakuda et al. | 358/1.15 |

OTHER PUBLICATIONS

International Telecommunication Union, ITU-T Series T: Terminals for Telematic Services T.38, Sep. 2005, 123 pages.

Dane Browning, Understanding IP Faxing, Lanier document, Oct. 2003, 20 pages.

CISCO-Fax over IP T.37 Store and Forward Fax, Jul. 10, 2007, 9 pages.

G. Parsons, RFC 3362—Real-time Facsimile (T.38)- image/t38 MIME Sub-type Registration, Aug. 2002, 4 pages.

K. Toyoda et al., A Simple mode of Facsimile Using Internet Mail, Internet Article, http://rfc.archivesat.com/rfc3965.htm, Dec. 2004, 12 pages.

K. Toyoda et al., Facsimile Using Internet Mail (IFAX) Service of ENUM, Internet Article, http://rfc.archivesat.com/rfc4143.htm, Nov. 2005, 5 pages.

Wikipedia, IP Multimedia Subsystem, http://en.wikipedia.org/w/index.php?title=IP_Multimedia_Subsystem, Oct. 17, 2008, 10 pages.

Wikipedia, Unified Messaging, http://en.wikipedia.org/w/index.php?title=Unified_messaging&printable=yes, May 25, 2007, 7 pages.

Newport Networks, Session Border Control in IMS—based Converged Networks, 2005, 4 pages.

Frost & Sullivan, North American Enterprise Voice and Unified Messaging Platform Markets, http://www.marketresearch.com/product/print/default.asp?SID=286, Dec. 28, 2006, 3 pages.

* cited by examiner

METHODS AND APPARATUS TO ROUTE FAX CALLS IN AN INTERNET PROTOCOL (IP) MULTIMEDIA SUBSYSTEM (IMS) NETWORK

FIELD OF THE DISCLOSURE

This disclosure relates generally to Internet protocol (IP) multimedia subsystem (IMS) networks and, more particularly, to methods and apparatus to route fax calls in an IMS network.

BACKGROUND

In some communication networks, such as a public switched telephone network (PSTN), a callee may not determine whether an incoming call is voice data or fax data before the call is answered. As a result, traditional fax machines are often connected to a dedicated PSTN telephone line, which imposes added expense to procure and maintain the dedicated line. For fax machine users that opt to employ a fax machine without a dedicated PSTN telephone line, situations will arise in which a call is answered by the callee that results in hearing unpleasant fax tones generated by a fax caller. Typically, the callee will hang-up the telephone and let the fax machine answer the call under the assumption that the caller will attempt to re-transmit the fax call.

On the other hand, if the caller is gracious enough to precede the attempted fax transmission with a preliminary voice call, then the callee may know not to answer a subsequent call under the assumption that it was originated by the fax caller. The callee's fax machine, whether it is connected to a shared voice/data PSTN line, a dedicated PSTN line, or part of a unified messaging (UM) platform, may receive the call, detect fax tones, negotiate a connection with the caller fax device (e.g., a fax machine employing the T.30 protocol), and transmit the fax data.

Voice and/or fax data may be transmitted (in part or in whole) via an Internet protocol (IP). In such circumstances, media gateways are typically employed to, in part, interface between PSTN and IP networks, handle traffic switching, and/or detect and adapt to one or more media types (e.g., Time Division Multiplex, IP conversion(s), fax tone detection, etc.).

Communication networks typically assume a received call is of a voice type, in which case if upon processing a call, a media gateway discovers one or more fax tones, and the media gateway forwards the tones to a media gateway controller. The media gateway controller receives the fax tone(s) from the media gateway and determines appropriate instructions required for subsequent handling of the call. Each interface with the media gateway and or the media gateway controller also includes one or more call signaling message exchanges (e.g., SS7, H.248, SIP, etc.), which may cause congestion within the communication network.

DETAILED DESCRIPTION

Methods and apparatus to route fax calls in an Internet protocol (IP) multimedia subsystem (IMS) network are disclosed. A disclosed example method includes receiving a message including a called party number and a media description at an IMS network, and determining if the media description is associated with a fax protocol. Additionally, when the media description is associated with a fax protocol, the example method attempts to locate a fax-specific uniform resource identifier (URI) associated with the called party number.

A disclosed example IMS fax server includes a session initiation protocol (SIP) parser to parse a received call for at least one fax identifier. The example IMS fax server also includes a query engine to attempt to locate a fax-specific URI associated with the fax identifier, and a fax director to route the received call to the fax-specific URI.

In the interest of brevity and clarity, throughout the following disclosure, references will be made to an example IMS communication system 100, an example IMS network 102, example IP networks 104, 106, and 108, and an example switched network, such as a public switched telephone network (PSTN) 110 of FIG. 1. The example PSTN 110 may facilitate plain old telephone services (POTS). The IMS network 102 may also communicatively operate with one or more public land mobile network(s) (PLMNs). Additional references will be made to access networks 112, 114, and 116, example IMS devices 118, 120, and a unified messaging platform 122.

Figure 1:
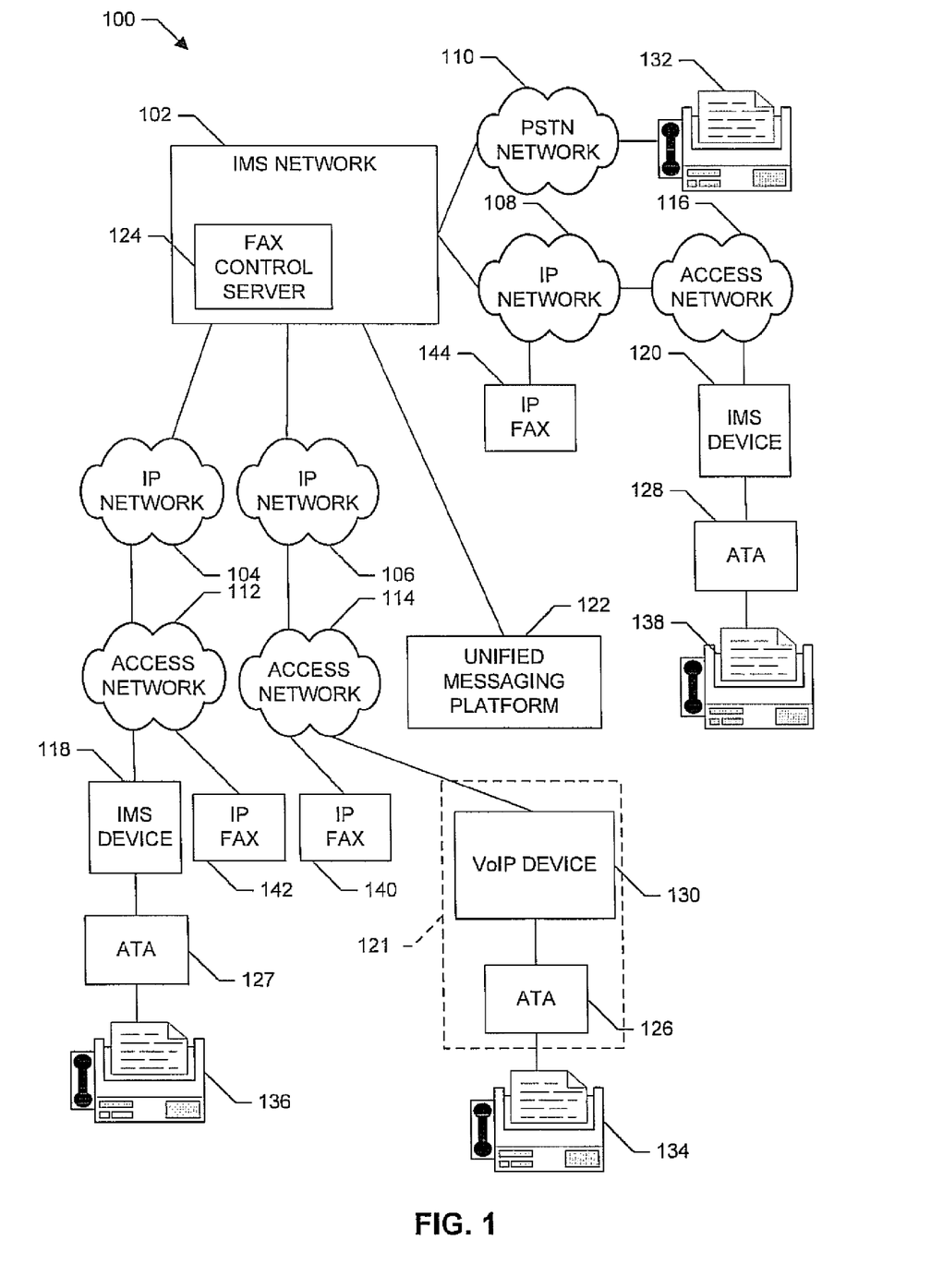
FIG. 1 is a schematic illustration of an example Internet Protocol Multimedia Subsystem (IMS) based communication system constructed in accordance with the teachings of the invention.

FIG. 1 is a schematic illustration of the example IMS communication system 100 that employs a fax control server 124 in the IMS network 102. In the illustrated example of FIG. 1, the IMS network 102 may facilitate communication services for any number and/or type(s) of MS devices 118, 120, and 121. Example IMS devices 118, 120, 121 include, but are not limited to, an IMS (e.g., voice over Internet Protocol (VoIP)) phone, an IMS residential gateway, an IMS enabled personal computer (PC), an IMS endpoint, a wireless IMS device (e.g., a wireless-fidelity (WiFi) IP phone), an IMS adapter (e.g., an analog telephone adapter (ATA) 126, 127, 128), an IMS enabled personal digital assistant (PDA), and/or an IMS kiosk. The example IMS devices 118, 120, 121 of FIG. 1 may be implemented and/or found at any number and/or type(s) of locations. Further, the IMS devices 118, 120, 121 may be fixed location devices, substantially fixed location devices, and/or mobile devices. Moreover, the IMS devices 118, 120, 121 may have equipment communicatively and/or electrically coupled to them. For example, an IMS ATA may be coupled to a telephone, a fax machine, a VoIP device 130 (e.g., VoIP telephone, a VoIP server) and/or an IMS residential gateway may be coupled to a PC and/or a set-top box.

To access IMS communication services throughout and/or within a site, location, building, geographic area and/or geographic region, the example IMS communication system 100 of FIG. 1 includes any number and/or type(s) of access networks, three of which are designated in FIG. 1 with reference numbers 112, 114, and 116. Generally speaking, the example access networks 112-116 provide and/or facilitate a communicative coupling of the IMS devices 118, 120, 121 to and/or with the IMS network 102, which provides and/or enables IMS communication services to the IMS devices 118-121. However, in some examples, one or more of the IMS devices 118-121 may access the IMS network 102 without use of an access network 112-116. The example access networks 112-116 may be implemented using any number and/or type(s) of past, present and/or future standards, specifications, communication devices, networks, technologies and/or systems, such as PSTN systems, PLMN systems (e.g., cellular), wireless distribution systems, wired or cable distribution systems, coaxial cable distribution systems, Ultra High Frequency (UHF)/Very High Frequency (VHF) radio frequency systems, satellite or other extra-terrestrial systems, cellular distribution systems, power-line broadcast systems, fiber optic networks, and/or any combination(s) and/or hybrid(s) of these devices, systems and/or networks.

While in the illustrated example of FIG. 1, each of the example IMS devices 118-121 are depicted as having an associated access network 112, 114, 116, such depictions are merely illustrative. For example, the example IMS devices 118-121 may utilize a common access network 112-116, an IMS device 118-121 may be configured and/or capable to utilize more than one access network 112-116 at the same and/or different times, and an IMS device 118-121 may be configured to access the IMS network 102 directly or via the IP networks 104-108 without an intervening access network 112, etc.

The example PSTN 110 may accommodate one or more traditional fax machines 132 that employ the T.30 protocol for, in part, session management between two fax machines. A traditional fax machine 134, 136, and 138 may interface with a non-PSTN based network with the aid of an ATA 126, 127, and 128. Generally speaking, an ATA may be implemented as a device to interface between an analog device, such as a traditional fax machine, a telephone, etc., and a non-PSTN based network, such as the example access networks 112-116. The ATAs may include one or more Ethernet port(s) to communicatively connect to, for example, a VoIP network, and/or include a wireless link to the VoIP network. Additionally, the ATAs may include one or more telephone ports capable of accepting a telephone jack, such as an RJ-11 jack typically used in the United States. However, the ATAs, such as the example ATAs 126, 127 and 128 may also employ alternate jack standards, such as RJ-14, RJ-25, etc. In operation, the example ATAs 126-128 permit one or more analog devices, such as a traditional fax machine 123-136, to communicate via the access network(s) 112-116 using one or more protocols, such as H.323, session initiation protocol (SIP), media gateway control protocol (MGCP), etc.

Unlike traditional fax machines 132-138, IP fax machines 140, 142, and 144 may communicate with each other via a direct connection to the access network(s) 112-116, or may connect to the access network(s) 12-116 via a VoIP device 130 without any need for an ATA. In the event that an IP fax machine 140-144 attempts to send/receive fax data to/from a traditional fax machine 132-136, then a gateway is employed, such as a media gateway discussed in further detail below.

One or more standards may be employed to enable fax transmission over the Internet. For example, T.37 is a store-and-forward fax mechanism, sometimes referred to as Internet fax (iFax). The T.37 standard uses an electronic mail (e-mail) transport, such as the simple mail transfer protocol (SMTP), to transfer one or more fax images in a tagged image file format (TIFF). The T.37 store-and-forward fax approach consumes processing resources to, for example, perform the conversion between the original fax data to an image format, package the fax data into an e-mail compatible format, send the e-mail message containing the fax information, and processing resources to retrieve and/or extract the fax information by the recipient. Additionally, e-mail systems may not allow transmitted fax information to be sent and/or received in a timely manner based on, for example, time of day use patterns or bandwidth limitations of one or more e-mail systems.

To package T.30 based fax data in a format appropriate for packet-based transmission, a T.38 standard may be employed. Typically, the T.38 standard is implemented via the media gateway, as described in further detail below.

Figure 2:
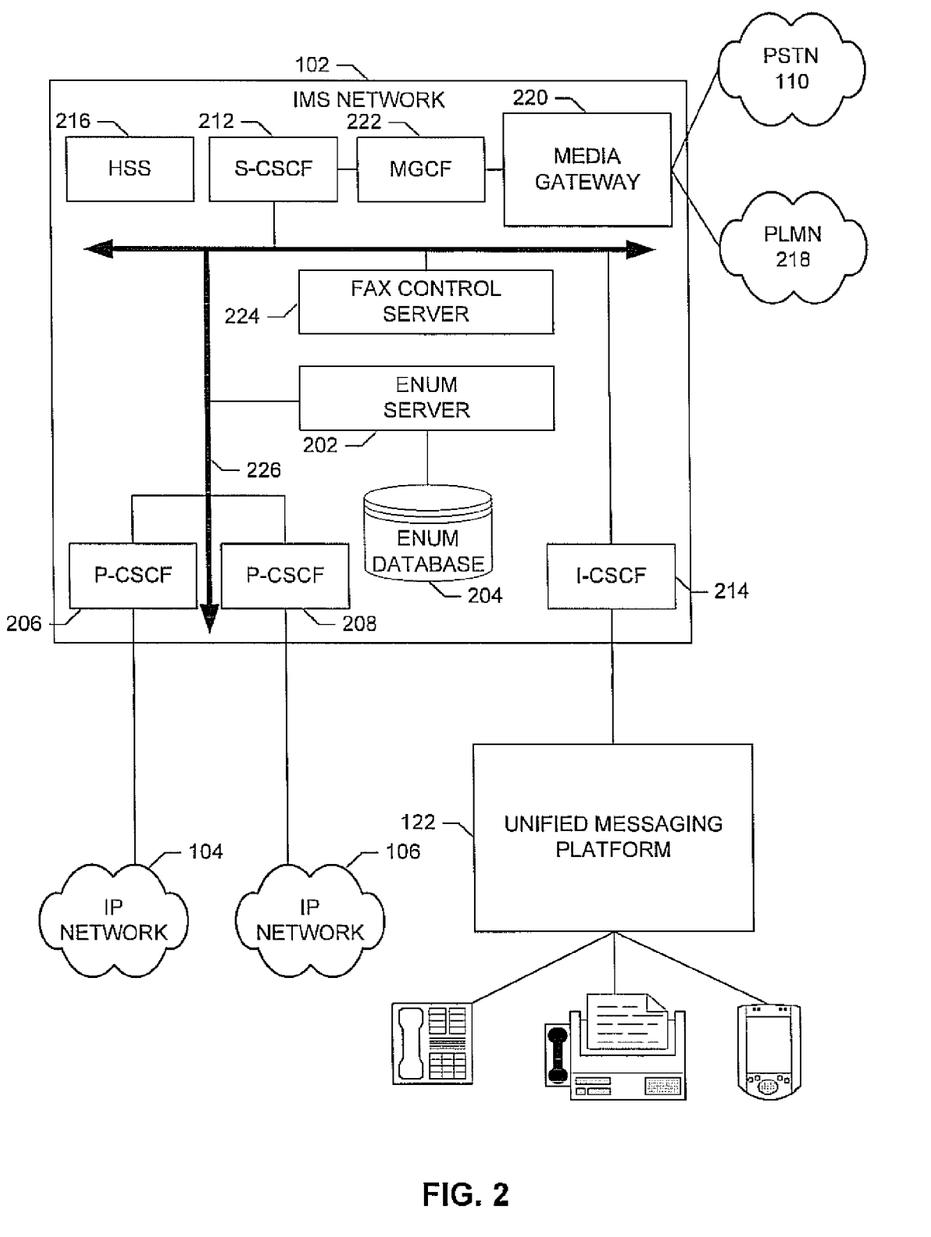
FIG. 2 is a schematic illustration of the IMS based communication system of FIG. 1.

FIG. 2 illustrates additional detail of the example IMS network 102 of FIG. 1. To provide IMS communication services (e.g., telephone services, fax services, Internet services, data services, messaging services, instant messaging services, electronic mail (email) services, data services, video services, audio services, gaming services, UM platform services, etc.), the example IMS communication system of FIG. 1 may include one or more IMS networks, one of which is designated in FIGS. 1 and 2 with reference numeral 102. The example IMS network 102 of FIG. 2 includes a telephone NUMber mapping (ENUM) server 202 and an ENUM database 204 used to, in part, obtain a SIP uniform resource identifier (URI) for a destination based on the telephone number associated with the destination. For example, a fax machine 132-138 may attempt to contact another fax machine by referencing the destination number. The ENUM server 202 resolves the referenced destination number to a SIP URI used within the IMS network 102 to route the fax information to the appropriate destination (e.g., the UM platform 122, a fax machine connected to an IP network 104-108, a fax machine connected to an access network 112-116, or a fax machine connected to a VoIP device 130).

To provide an access entry point for an IMS device 118-121 and/or the UM platform 122 into the IMS network 102, the example IMS network 102 of FIG. 2 includes any number and/or type(s) of proxy call session control function (P-CSCF) servers, two of which are designated in FIG. 2 with reference numerals 206 and 208. The example P-CSCF servers 206 and 210 of FIG. 2, among other things, route SIP messages between IMS devices 118-121 and their associated serving call session control function (S-CSCF) servers, one of which is illustrated in FIG. 2 with reference numeral 212. S-CSCF servers, such as the S-CSCF server 212 of FIG. 2, are responsible for handling incoming and/or outgoing IMS communication sessions (e.g., telephone calls, fax calls, data sessions, video sessions, etc.) associated with IMS devices registered thereto. While only a single S-CSCF server 212 is illustrated in FIG. 2, the IMS network 102 may include any number and/or type(s) of S-CSCF servers, and each such S-CSCF server may support any number and/or type(s) of IMS devices 118-121. The example S-CSCF server 212 of FIG. 2 may perform session control, maintain session states, and/or enable communication with a call feature server (not shown).

To locate and/or identify the S-CSCF server 212 that may be associated with a particular IMS device, the example IMS network 102 of FIG. 2 includes any number and/or type(s) of interrogating call session control function (I-CSCF) servers, one of which is designated in FIG. 2 with reference number 214. The example I-CSCF server 214 of FIG. 2 serves as a contact point within the example IMS network 102 for connections destined for an IMS device 118-121 of the IMS communication system 100, and/or for an IMS device 118-121 located within the serving area of the IMS communication system (e.g., a roaming subscriber). The example I-CSCF 214 also directly interfaces with UM platforms, such as the example UM platform 122 of FIGS. 1 and 2. Generally speaking, the I-CSCF server 214 identifies which corresponding S-CSCF server 212 should be used for a particular destination IMS device 118-121. After such identification, any IMS protocol messages directed to the destination IMS device 118-121, and/or any communication devices connected thereto (e.g., a fax machine), are then routed to the S-CSCF server 212 identified by the I-CSCF server 214.

To manage subscriber information, and/or to enable subscribers and/or servers to locate other servers, subscribers and/or destinations, the example IMS network 102 of FIG. 2 includes any number and/or type(s) of home subscriber server(s) (HSSs), one of winch is designated in FIG. 2 with reference numeral 216. The example HSS 216 of FIG. 2 maintains a device profile and/or one or more preferences for each subscriber and/or IMS device 118-121 of the IMS network 102. The example I-CSCF server 214 of FIG. 2 uses information contained in the HSS 216 to, for example, determine and/or locate the S-CSCF server 212 associated with a particular subscriber and/or IMS device 118-121.

To process and/or handle communication session data between (1) any or all of the example IMS devices 118-121, and (2) a PSTN 110 and/or a public land mobile network (PLMN) 218 (e.g., a cellular communication network), the example IMS network 102 of FIG. 2 includes any number and/or type(s) of media gateways, one of which is designated in FIG. 2 with reference number 220. Using any number and/or type(s) of technique(s), method(s), and/or algorithm(s), the example media gateway 220 of FIG. 2 performs any appropriate media data conversion(s) between, for example, a circuit-based transmission format used by the PSTN 110 and a packet-based format and/or data structure used by any or all of the PLMN 218, the IMS network 102, the EP network(s) 104, 106, and/or the IMS device(s) 118-121. Additionally, the media gateway may be employed to convert incoming calls into a voicemail format, and/or an e-mail format, as described in further detail below.

To control the example media gateway 220, the example IMS network 102 of FIG. 2 includes any number and/or type(s) of media gateway control function (MGCF) servers, one of which is designated in FIG. 2 with reference number 222. Using any number and/or type(s) of technique(s), method(s) and/or in accordance with any past, present and/or future specification(s) and/or standard(s) such as, for example, the Internet Engineering Task Force (IETF) Request for Comment (RFC) 3015 and/or the International Telecommunications Union (ITU) H.248 standard, the example MGCF server 222 of FIG. 2 performs signaling, session control and/or session management for incoming and/or outgoing IMS communication sessions that originate in and/or terminate in, for example, the example PLMN 218 and/or the example PSTN 110.

To route fax communications to/from IMS devices 118-121, and/or to/from traditional fax machines that may be communicatively connected to the IMS devices (e.g., via an ATA 126, 127, 128), the example IMS network 102 includes a fax control server 224. Traditional attempts to route fax calls in an IMS network typically required that the media gateway 220 handle all traffic switching and media adaptation (e.g., time division multiplexing, IP conversion, etc.), and voice services (e.g., voice compression, echo cancellation, etc.). Additionally, the MGCF 222 is typically chartered with the responsibility of handling all call signaling, such as SS7, H.248, and control functionality. When a call is initially received by an IMS network that employs a traditional method of fax propagation, the IMS network does not know whether the incoming call is that of voice or fax data. In view of the increased chances that an incoming call is a voice call, the traditional IMS network would assume that the call is a voice call, which required the media gateway 220 to set up an IP path. In particular, if the destination number is resolved by the ENUM server 202 to be associated with a callee (destination) within the PSTN 110 and/or the PLMN 218, call signaling activity is required within the IMS network to facilitate proper routing.

However, because the possibility exists that a received call is a fax call rather than a voice call, the media gateway 220 of a traditional IMS network typically employs processing resources to detect fax tones. Accordingly, after the initial assumption that the call is believed to be a voice call is determined to be false based on the detection of such fax tones, the media gateway 220 may begin to employ procedures based on T.38, or based on T.37 to facilitate an e-mail based store-and-forward mechanism. If the intended fax recipient has a traditional fax machine connected to, for example, an IMS device 118-121 (e.g., via an ATA) and/or a traditional fax machine connected to one or more accounts associated with the UM platform 122, the media gateway is still employed to package the fax information in a T.37 store-and-forward manner. In other words, the fax is ultimately sent to the recipient's voicemail platform as an e-mail rather than directly to a capable fax machine.

The methods and apparatus described herein, however, allow the example IMS communication system 100 to route fax calls in a more efficient manner by, for example, avoiding unnecessary processing by the media gateway when the recipient does not prefer fax-to-electronic mail conversion. As described in further detail below, an example fax control server may detect that an incoming call is a fax call without employing processing intensive tone-detection resources, and route the call in a manner preferred by the caller and/or callee. As illustrated in FIG. 2, the example ENUM server 202, ENUM database 204, the example P-CSCF servers 206 and 208, the example S-CSCF server 212, the example I-CSCF server 214, the example HSS 216, the example media gateway 220 and associated MGCF 222, and the example fax control server 224 communicate and/or are communicatively coupled via any number, type(s), and/or combination of communication paths, communication networks, busses, and/or communication devices 226.

While an example IMS communication system 100, example IMS devices 118-121, and an example IMS network 102 have been illustrated in FIGS. 1 and 2, the devices, networks, systems, servers, and/or processors illustrated in FIGS. 1 and 2 may be combined, divided, re-arranged, eliminated, and/or implemented in any way. For example, it will be readily appreciated by persons of ordinary skill in the art that the example P-CSCF servers 206 and 208, the example S-CSCF server 212, the example I-CSCF server 214, the example HSS 216, the example media gateway 220 and associated MGCF 222, the example ENUM server 202 and associated ENUM database 204, and the example fax control server 224 illustrated in FIG. 2 may be implemented separately and/or in any combination using, for example, machine accessible instructions executed by one or more computing devices and/or computing platforms. Further, the example P-CSCF servers 206 and 208, the example S-CSCF server 212, the example I-CSCF server 214, the example HSS 216, the example media gateway 220 and associated MGCF 222, the example ENUM server 202 and associated ENUM database 204, the example fax control server 224, and/or the example IMS network 102 may include additional devices, servers, systems, networks, gateways, portals, and/or processors in addition to, or instead of, those illustrated in FIG. 9, and/or may include more than one of any or all of the illustrated devices, servers, networks, systems, gateways, portals, and/or processors. For example, an IMS network 102 may include any number and/or type(s) of media gateways, media gateway control function (MGCF) servers, breakout gateway control function (BGCF) servers, and/or session border controllers.

Figure 3:
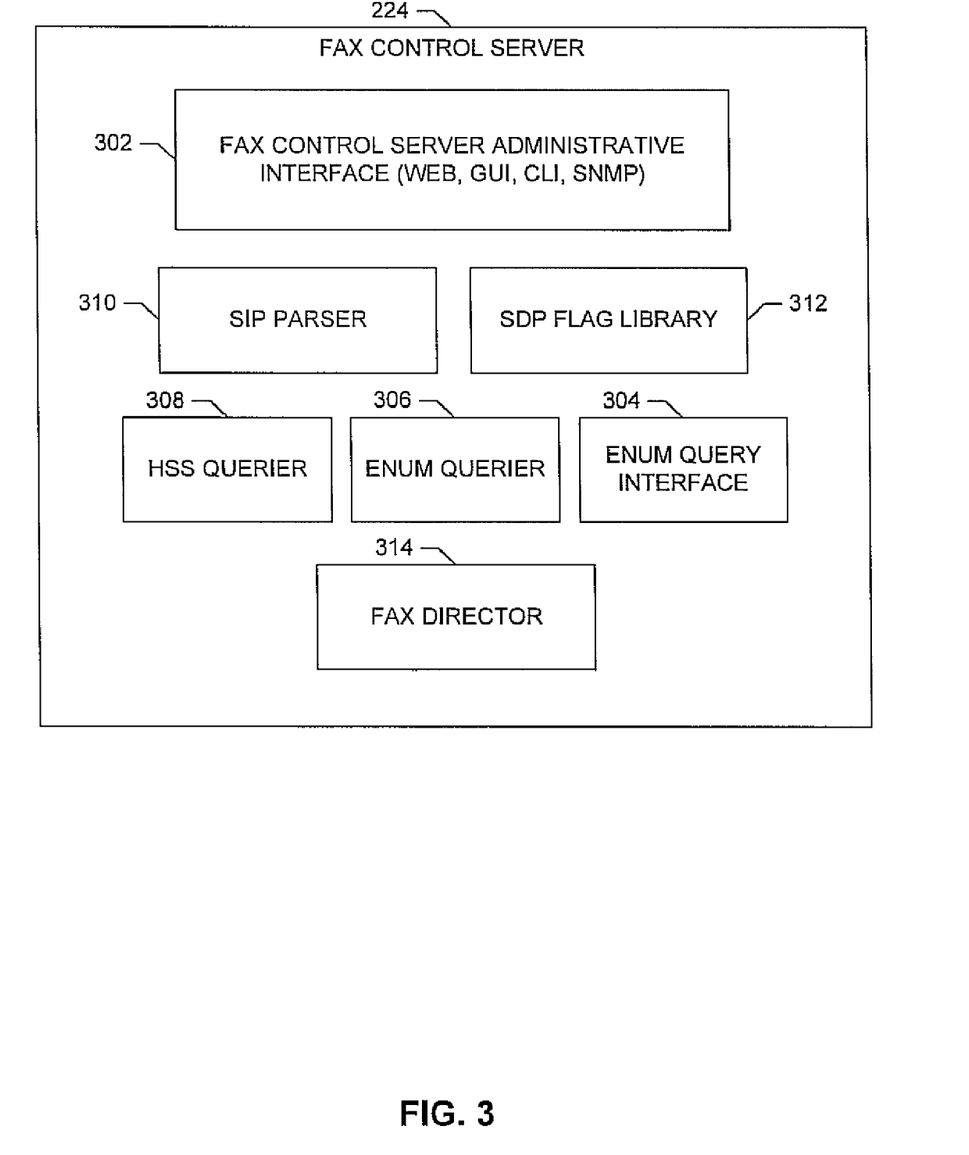
FIG. 3 illustrates an example manner of implementing the example fax control server of FIGS. 1 and 2.

FIG. 3 illustrates an example manner of implementing the example fax control server 224 of FIG. 2. To allow the example fax control server 224 of FIG. 3 to be administered, the example fax control server 224 includes any type of administrative interface 302. The example administrative interface 302 of FIG. 3 may be implemented on one or more of a command-line interface (CLI), a graphical user interface (GUI), a web-based interface, and/or a simple network management protocol (SNMP) interface. The example administrative interface 302 may be used to remotely administer and/or configure the example fax control server 224, to load the ENUN database 204 with URIs, and/or to customize the HSS 216 in view of subscriber preferences.

To allow call servers (e.g., the example S-CSCF server 212 of FIG. 2) to perform, for example, an ENUM query, the example fax control server 224 of FIG. 3 includes any type of ENUN query interface 304. Using any message(s), format(s), and/or protocol(s) (e.g., in accordance with Internet Engineering Task Force (IETF) Request for Comment (RFC) 3761), the example ENUM query interface 304 of FIG. 3 exchanges ENUM query request messages and ENUM query response messages with call servers. An example ENUM querier 306 (a query engine) may perform one or more ENUM lookups, via the ENUM query interface 304, in the ENUM database 204 of FIG. 2 to identify a SIP URI to which the call may be directed. ENUM lookups may be performed by the ENUM querier 306 to perform a lookup of the ENUM database 204 of FIG. 2 to identify one or more SIP URIs associated with, for example, a telephone number of the callee (destination).

The example fax control server 224 of FIG. 3 also includes another query engine in the form of an HSS querier 308 to allow one or more queries against the example HSS 216 of FIG. 2. For example, the HSS 216 of FIG. 2 may contain profiles for subscribers of IMS services. Each of the subscribers may be identified, for example, by a telephone number and/or a URI that, when identified within the HSS 216, provide one or more customization parameters. In many instances, because a subscriber's profile is managed by the HSS, network complexity may be minimized and/or the subscriber and/or service provider may further customize call routing by modifying the HSS parameters. In some examples, an ENUM database may identify a default URI associated with a destination number. However, the example fax control server 224 employs the HSS querier 308 to determine whether the destination number and/or the associated URI includes alternate instructions regarding where a received call should be routed. While a subscriber may have a default URI, service providers may allow subscribers greater flexibility regarding how received communications are handled by giving them the ability to modify and/or customize the date in the HSS 216 via, for example, a user interface. Consequently, the fax control server 224 may employ the HSS querier 308 to determine whether an alternate URI identifies where a call should be routed (e.g., automatically route all known fax calls to a fax machine of the UM platform 122, route all known fax calls to e-mail, route all known voicemail messages to e-mail, etc.).

The example fax control server 224 also includes a SIP parser 310 to receive SIP messages associated with a call received by the IMS network 102. In the event that a fax call is to be sent via the example IMS network 102, an IP fax machine may attach SIP messages to the call signal received by the P-CSCFs 206-210 (such SIP messages may alternatively be attached by a traditional fax machine communicatively connected to the access network(s) 112-116 via an ATA 126-128). Rather than require the media gateway 220 to assume that any received call is a voice call and/or employ resource intensive fax tone detection routine(s), the example SIP parser 310 of FIG. 3 determines whether the received call includes SIP messages to determine if the call is a fax call. In particular, the SIP parser 310 compares the parsed SIP message(s) against a session description protocol (SDP) flag library 312. If the SDP flag library 312 includes a matching SDP payload indicative of a fax message, then a fax director 314 may invoke the HSS querier 308 to determine how the incoming call should be routed. In other words, the SDP in SIP (e.g., SDP payload information embedded in a SIP message) facilitates identification of one or more fax-specific URIs to route fax calls without relying upon the traditional, computationally intensive services and/or bandwidth intensive intra-IMS communication of the media gateway 220.

The SDP messages may be implemented in any manner including, but not limited to, user datagram protocol (UDP) packets having a session announcement protocol (SAP) header. The if UDP packets may include a text payload that identifies, for example, a session name, a session purpose, a time for which the session is active, a media type of the session, and/or an address to receive the media. Accordingly, based on receiving, parsing, and/or processing the SDP payload, the example fax control server 224 may facilitate more efficient operation of the IMS network 102 by eliminating unnecessary media gateway 220 procedures to identify an incoming call type and to allow a fax message to be forwarded to a destination in a manner dictated by the recipient.

Figure 4:
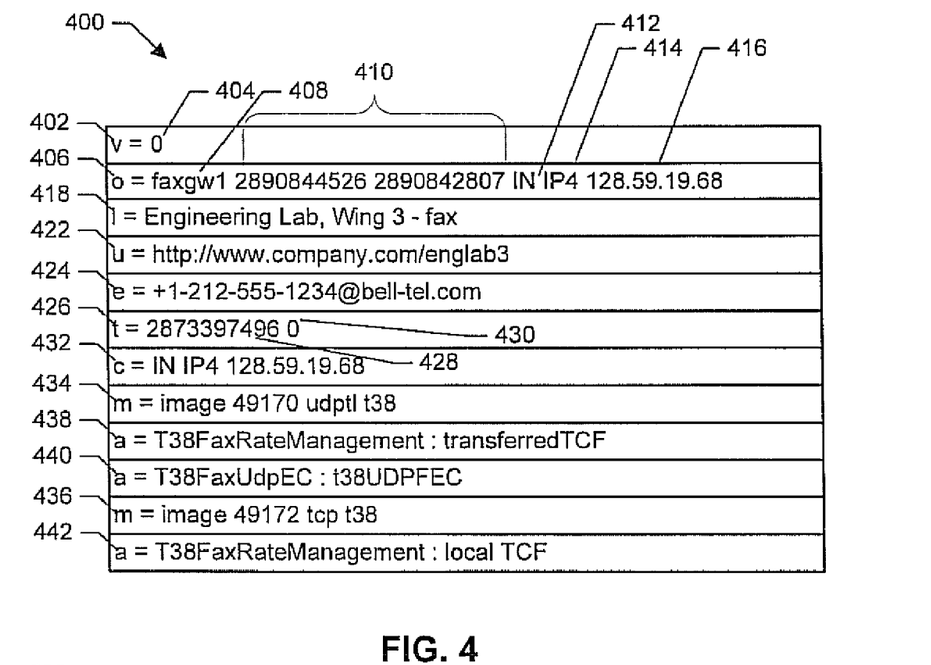
FIG. 4 illustrates an example SDP payload that may be used to route a call in the example IMS based communication system of FIG. 1.

FIG. 4 illustrates an example SDP payload 400 that may accompany a SIP message. In the illustrated example of FIG. 4, the SDP payload 400 includes SDP information as a type identifier and a corresponding value, each of which are separated by an equal sign ("="). In the illustrated example, a protocol version ("v") 402 type (in the example, having an example value "0" 404) identifies a corresponding protocol version of the SDP payload 400. An identifier "o" 406 relays session origin information value(s), such as a username 408, a session identification value 410, a network type identifier 412, an address type identifier 414, and an IP address 416. The example SDP payload 400 also includes a session description ("i") 418, a URL ("u") 422, and an e-mail address ("e") 424, each of which include corresponding value information following the equal sign ("="). Additionally, the example payload 400 may include a time ("t") 426, which may indicate a start time 428 and a stop time 430. In the illustrated example of FIG. 4, the stop time 430 is zero ("0"), which indicates that the session is not bounded. The example payload 400 may also include a connection field ("c") 432, one or more media fields ("m") 434, 436, and/or one or more attribute fields ("a") 438, 440, and 442.

However, an SDP payload may include any number of type identifiers, as described in Internet Engineering Task Force (IETF) Request for Comment (RFC) 2327, not all of which need be employed in the methods and apparatus described herein.

Figure 5:
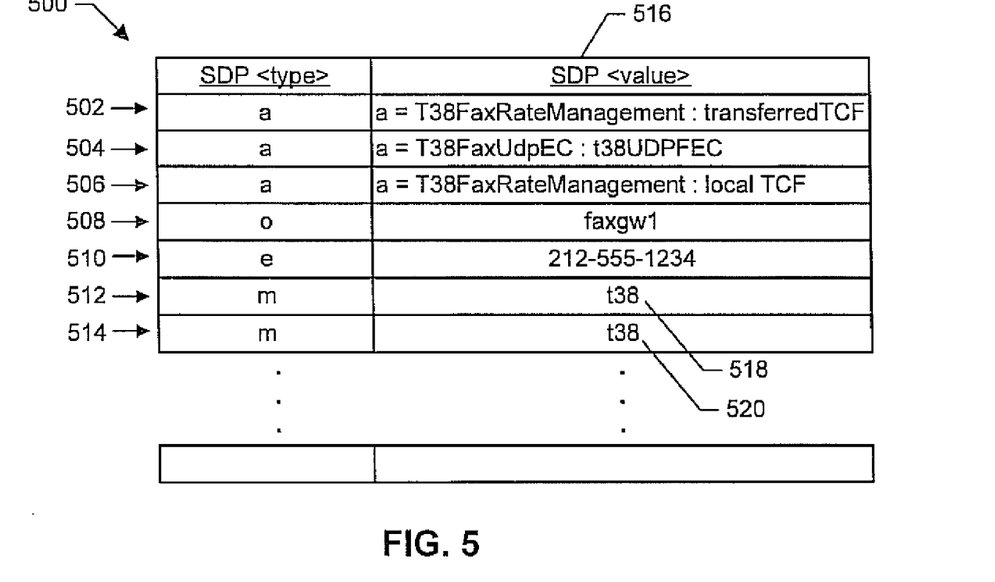
FIG. 5 illustrates an example SDP table that may be used to route a call in the example IMS based communication system of FIG. 1.

In operation, the example SIP parser 310 receives a SIP message, extracts the SDP payload 400 from the SIP message, and generates an SDP table 500, as shown in FIG. 5. In the illustrated example of FIG. 5, the SDP table 500 is populated with SDP type information extracted from the SDP payload 400 that matches a type of interest from the SDP flag library 312. For example, while RFC 2327 describes SDP payload information that may contain a protocol version 402, and/or an encryption key value (not shown), etc., the example SDP flag library 312 allows the SDP parser 310 to build the SDP table with information relevant to the methods and apparatus described herein, and to ignore information that may be contained within any SDP payload, but which is not of interest to the task at hand.

From the example SDP payload 400 of FIG. 4, the SDP parser 310 generated the example SDP table 500 containing only a portion of the SDP payload 400 of FIG. 4. In particular, the example SDP table 500 of FIG. 5 contains only attribute information 502, 504, 506, origin information 508, a destination 510, and media field information 512 and 514. While the origin information 406 of FIG. 4 includes a session identifier 410, a network type identifier 412, etc., the SDP parser 310 has only extracted the username 408 and placed such username information in an SDP value column 516 of the SDP table 500. The SIP parser 310 allows, in part, the example fax control server 224 to identify an indication of a fax call. For example, one or more indications of a fax call may be present in the SDP payload 400 when an IP fax machine transmits a fax call, and/or in the event a traditional/analog fax machine is connected to an ATA. In the latter case, the ATA may have one or more ports specifically configured as a fax port under the expectation that all calls therethrough will be fax calls. Typically, a real-time fax protocol would include T.38, but persons having ordinary skill in the art will appreciate that other protocols may be used. Additionally, while the illustrated example SDP table 500 of FIG. 5 shows a plurality of information indicative of a fax, more or fewer indicators may be employed and/or extracted by the SIP parser 310, without limitation. For example, the SIP parser 310 may be configured to extract an indication of a fax call only from payload origin information, or may be configured to extract any indication of a fax call, regardless of the payload type.

In the illustrated example of FIG. 5, the SIP parser 310 has extracted at least five indications that the call is a fax call. In particular, the example SIP parser 310 has extracted three attribute fields 43S, 440, and 442 from the SDP payload 400, each of which indicate a fax protocol and/or the term "fax." Additionally, the example SIP parser 310 has extracted two indications that the call is a fax call by extracting two media fields 512 and 514. Although the payload 400 media fields 434 and 436 are arranged to identify <media type>, <port number>, and <transport>, the SIP parser 310 has populated the example SDP table 500 with portions of the media fields (512 and 514) that indicate a fax call (i.e., "t38") 518 and 520. The example SIP parser 310 may deem the call a fax call in response to detecting keywords indicative of a fax including, but not limited to, "fax," "T.38," "T.38fax," etc.

While example data structures used to store SDP information are illustrated in FIG. 5, the example data structure 500 of FIG. 5 may be implemented using any number and/or type(s) of other and/or additional entries, fields, and/or data. Further, the entries, fields, and/or data illustrated in FIG. 5 may be combined, divided, re-arranged, eliminated, and/or implemented in any way.

Figure 6:
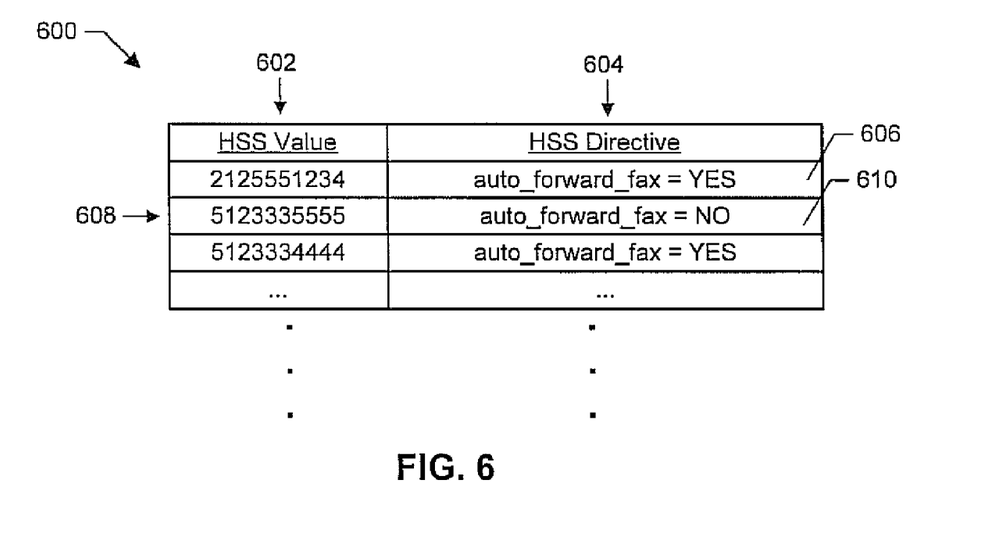
FIG. 6 illustrates an example HSS table that may be used to determine profile information of a subscriber in the example IMS based communication system of FIG. 1.

While the example fax director 314 may route a received call to a URI based on an ENUM query or based on a URI identified in the SDP, the example fax control server 224 employs the HSS querier 308 to determine whether the call recipient has identified customized instructions regarding call routing. The HSS querier 308 queries the HSS 216 for the recipient's profile, and, in the event that the recipient has identified one or more URIs and/or other instruction(s) in their profile, the HSS querier 308 uses SDP values from the SDP table 500 to find a match. For example, the example HSS 216 may include a profile table 600, part of which is shown in FIG. 6. In operation, the HSS querier 308 determines whether the profile table 600 includes one or more SDP values from the SDP table 500 in an HSS value column 602. As shown in example FIG. 6, the profile table 600 includes a value "2125551234," which is at least one of the values also located in the example SDP table 500 of FIG. 5. As a result, the HSS querier 308 extracts the corresponding data from an HSS directive column 604. In the illustrated example, the extracted data is a special handling instruction for the fax call (auto_forward_fax=YES) 606 to be used in the event that "2125551234" is a value of the SDP table 500. The example fax director 314 of FIG. 3 then causes the received call to be transferred to a SIP URI in ENUM for fax 606.

Figure 7:
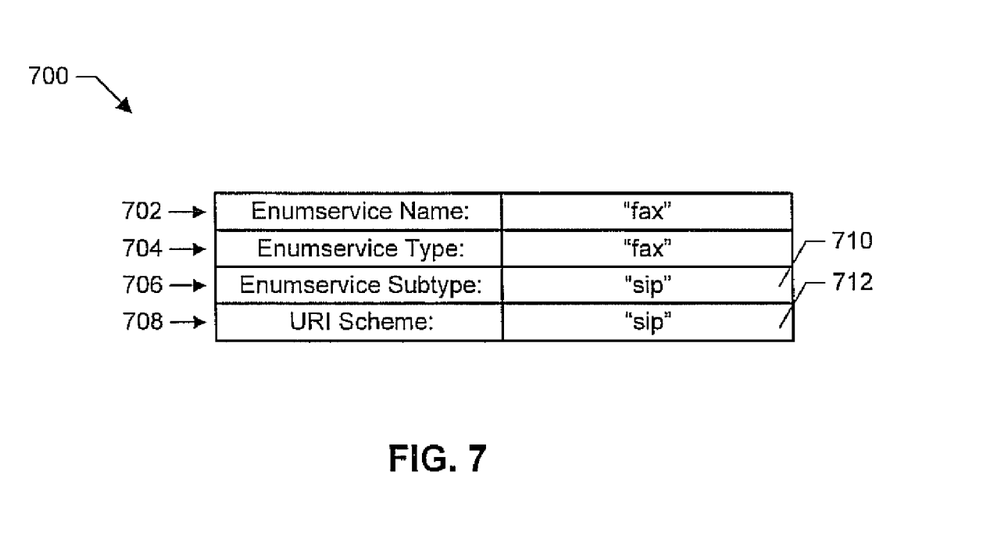
FIG. 7 illustrates an example ENUM service that may be used to route calls to a SIP URI.

Upon determining that special handling is requested for the fax call, the example fax director 314 invokes the ENUM querier 306 to locate a SIP URI for fax and, upon locating the SIP URI, directing the call to the located SIP URI. Persons having ordinary skill in the art will appreciate that the Internet Assigned Numbers Authority (IANA) defines and publishes a finite number of ENUM services. In particular, at the time of this writing, the IANA ENUM service registrations included a Service Name "iFax" and an ENUM service type "fax." However, neither registration accommodates an ENUM service subtype of SIP nor a URI scheme of SIP. To that end, FIG. 7 illustrates an ENUM SIP URI fax service 700 to accommodate the SIP URI for fax. In the illustrated example of FIG. 7, the example ENUM service 700 includes IANA template specifications of Enumservice Name 702, Enumservice Type 704, Enumservice Subtype 706, and URI Scheme 708. Additionally, the example ENUM SIP URI fax service 700 includes an Enumservice Subtype 706 and URI Scheme 708 of type "SIP" 710 and 712.

After querying the HSS 216 to invoke the ENUM querier 306 in view of the special handling instructions 606, the ENUM SIP URI fax service 700 allows identification of a fax specific URI to which the call may be routed. As a result, the example IMS network 102 may identify and route fax calls without employing the media gateway 220 unnecessarily.

Briefly returning to FIG. 6, without limitation, the example profile table 600 may include other values, such as, for example, "5123335555" 608 that, if part of the SDP table 500, would allow the fax director 314 to route the received call via an alternate handling instruction 610 associated with "5123335555" 608. As a result, the alternate handling instruction 610 (auto_forward_fax=NO) may be indicative of the subscriber's desire to receive fax calls in an alternate manner. Additionally or alternatively, one or more combinations of values located in a profile table 600 may be used to determine an appropriate URI ENUM service, or destination to which a received call should be routed. For example, a username may be associated with one or more session descriptions, such as one or more departments within a corporation (e.g., engineering lab, marketing department, finance department, sales, etc.). Accordingly, the HSS 216 may include a particular combination, for example, of the username and a session name (e.g., a session name "s" as defined by RFC 2327), which may result in a fax specific SIP URI routine destination. On the other hand, the HSS 216 may include an alternate URI associated with any combination of HSS and/or SDP parameters.

Figure 8:
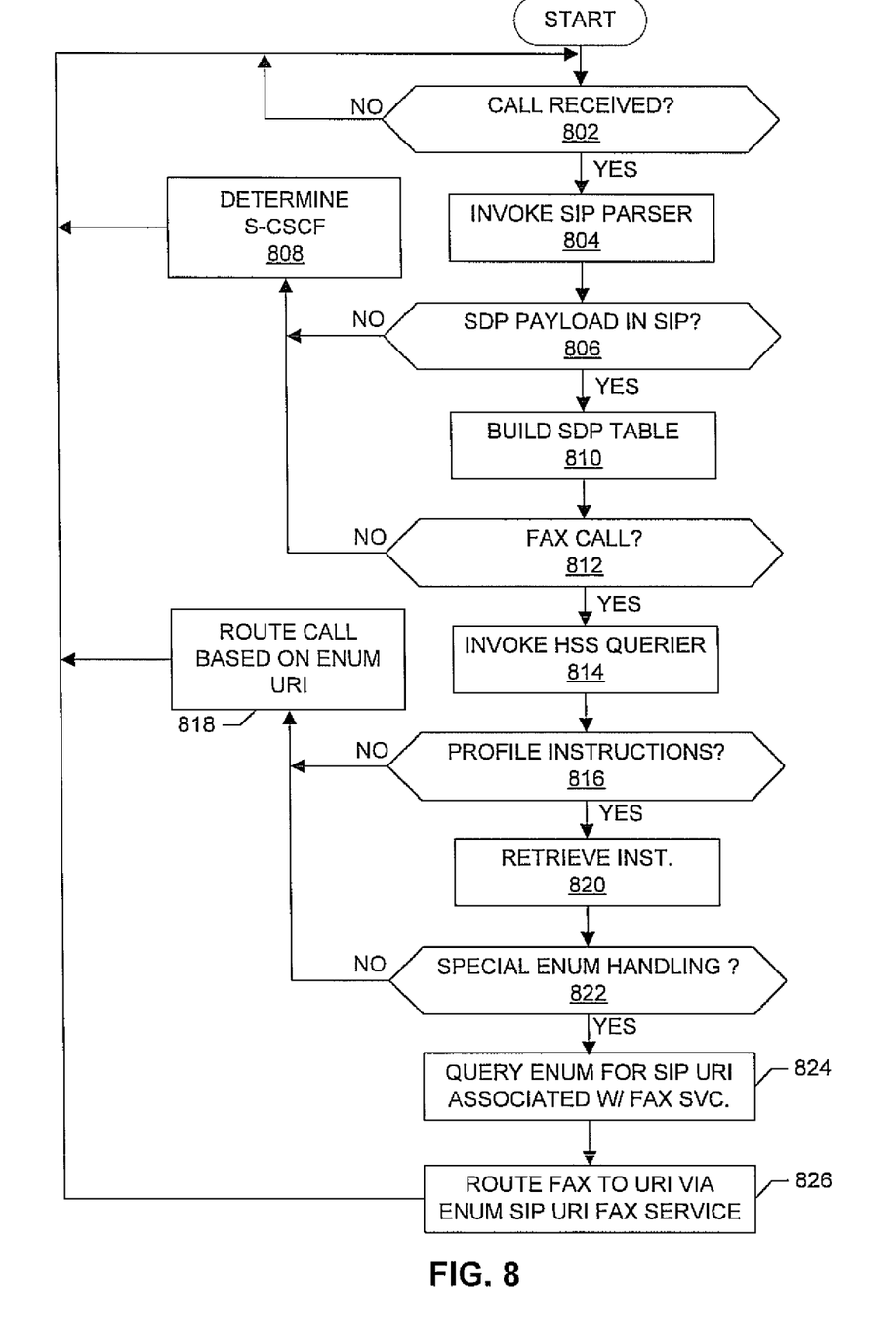
FIG. 8 illustrates example machine accessible instructions that may be executed to implement the example fax control server of FIGS. 1-3.

FIG. 8 illustrates example machine accessible instructions that may be executed to implement any or all of the example fax control servers 224 of FIGS. 1-3. The example machine accessible instructions of FIG. 8 may be carried out by a processor, a controller and/or any other suitable processing device. For example, the example machine accessible instructions of FIG. 8 may be embodied in coded instructions stored on a tangible medium such as a flash memory, a ROM and/or RAM associated with a processor (e.g., the example processor 900 discussed below in connection with FIG. 9). Alternatively, some or all of the example machine accessible instructions of FIG. 8 may be implemented using any combination(s) of ASIC(s), PLD(s), FPLD(s), discrete logic, hardware, firmware, etc. Also, some or all of the example machine accessible instructions of FIG. 8 may be implemented manually or as any combination of any of the foregoing techniques, for example, any combination of firmware, software, discrete logic and/or hardware. Further, although the example machine accessible instructions are described with reference to the flowchart of FIG. 8, many other methods of implementing the machine accessible instructions of FIG. 8 may be employed. For example, the order of execution of the blocks may be changed, and/or one or more of the block described may be changed, eliminated, sub-divided, or combined. Additionally, any or all of the example machine accessible instructions of FIG. 8 may be carried out sequentially and/or carried out in parallel by, for example, separate processing threads, processors, devices, discrete logic, circuits, etc.

The example machine accessible instructions of FIG. 8 begin when a call is received by the Fax control server 224 of the IMS network 102 from an IMS device 118-121 (block 802). The fax control server 224 may receive an indication of a call in any number of ways. For example, the call may be received by one of the P-CSCF servers 206 and 208, which may in turn direct the call to the S-CSCF server 212 associated with the calling party. Generally speaking, the calling party (i.e., at one of the IMS devices 118-121) sends a SIP INVITE message to the IMS network 102, and the SIP INVITE message may identify both the calling party and the called party. While a traditional IMS network typically performs an ENUM query by sending an ENUM query request message to an ENUM server upon receipt of a call, the methods and apparatus described herein allow the example IMS network 102 to invoke the SIP parser 310 (block 804) of the fax control server 224 to avoid invocation of computationally intense functions of the media gateway 220 and/or a T.38 to T.37 gateway when it is determined that a received call is a fax call. As described above, the traditional IMS network assumes all received calls are voice calls and establishes end-point connectivity within the IMS network before discovering that the call is a fax call. Additionally, even after determining that the call is a fax call, the traditional IMS network assumes that all such fax calls must be routed to the destination via T.37 store-and-forward mechanism(s), thereby requiring conversion to an e-mail format.

In contrast, before establishing end-point connectivity, the example SIP parser 310 determines whether the SIP message received from the calling party IMS device 118-121 includes an SDP payload (block 806). If the received SIP message does not include an SDP payload, then the example fax control server 224 relinquishes responsibility of the received call, and the IMS network 102 proceeds to handle the call in a manner consistent with traditional IMS network(s) (block 808). However, if the SIP parser 310 determines that the SIP message includes an SDP payload (block 806), then the SIP parser 310 extracts relevant SDP information to build an SDP table (block 810), such as the example SDP table 500 shown in FIG. 5. While a SIP message may include an SDP payload for purposes other than fax handling, the example SIP parser 310 of FIG. 3 employs the SDP flag library 312 to extract only such SDP information that is relevant for handling fax calls, including making the determination as to whether the calling party is sending a fax call (block 812). For example, the SIP parser 310 may scan SDP value information for an indication that the corresponding call is a fax call (e.g., a session description such as the example session description 504 of FIG. 5 (e.g., "a") having the term "fax" listed therein). In the event that the SDP payload 400 does not indicate that the call is a fax, then the example fax control server 224 relinquishes responsibility of the received call, and the IMS network 102 proceeds to handle the call in a manner consistent with traditional IMS network(s) (block 808).

On the other hand, upon determining that the SDP payload 400 identifies the originating call as of type "fax," the example fax control server 224 invokes the HSS querier 308 (block 814) to determine whether the called party has a corresponding profile in the HSS 216. If the HSS querier 308 determines that the HSS 216 does not have any URIs and/or instructions associated with the called party (block 816), then the example IMS network 102 employs the ENUM server 202 to determine a destination (block 818) in a traditional manner (e.g., the IANA registered iFax Enumservice). Such routing may include invocation of the media gateway 220 to convert the call to an e-mail message. However, if the example HSS 216 includes one or more URIs and/or instructions associated with a profile of the called party, such URIs and/or instructions are retrieved by the HSS querier 308 (block 820).

The example fax director 314 determines whether the retrieved HSS instructions are associated with standard IANA registered ENUM services (e.g., iFax), or whether the retrieved HSS instructions are special ENUM services (block 822). In the event that the retrieved HSS instructions are of a standard type (block 822), as indicated by, for example, an HSS Directive 604 of "auto_forward_fax=NO" 610, then the fax director 314 may invoke the ENUM querier 306 to locate an e-mail URI in ENUM (block 818). As described above, the fax director 314 may employ a T.38 to T.37 gateway to route the call to the e-mail URI.

On the other hand, in the event that the retrieved HSS instructions are of a special type (block 822), as indicated by, for example, an HSS Directive 604 of "auto_forward_fax=YES" 606, then the fax director 314 may invoke the ENUM querier 306 to locate a SIP URI for fax (block 824). As a result, the fax director 314 invokes the SIP URI fax service to forward the call to the SIP URI for fax (block 826). Accordingly, the methods and apparatus described herein eliminate the need for traditional fax tones (e.g., T.30 protocol) to be converted to e-mail (e.g., T.37 protocol) by the media gateway 220 unnecessarily. Significant processing resources may be conserved by bypassing the media gateway 220 in this manner.

Without limitation, the example HSS 216 may identify a specific URI for which the fax director 314 may identify a destination within the UM platform 122 and/or other network that does not require conversion to an e-mail format. Moreover, the subscriber may prefer that fax calls be directed to a fax machine rather than inundate an e-mail inbox, for example.

Figure 9:
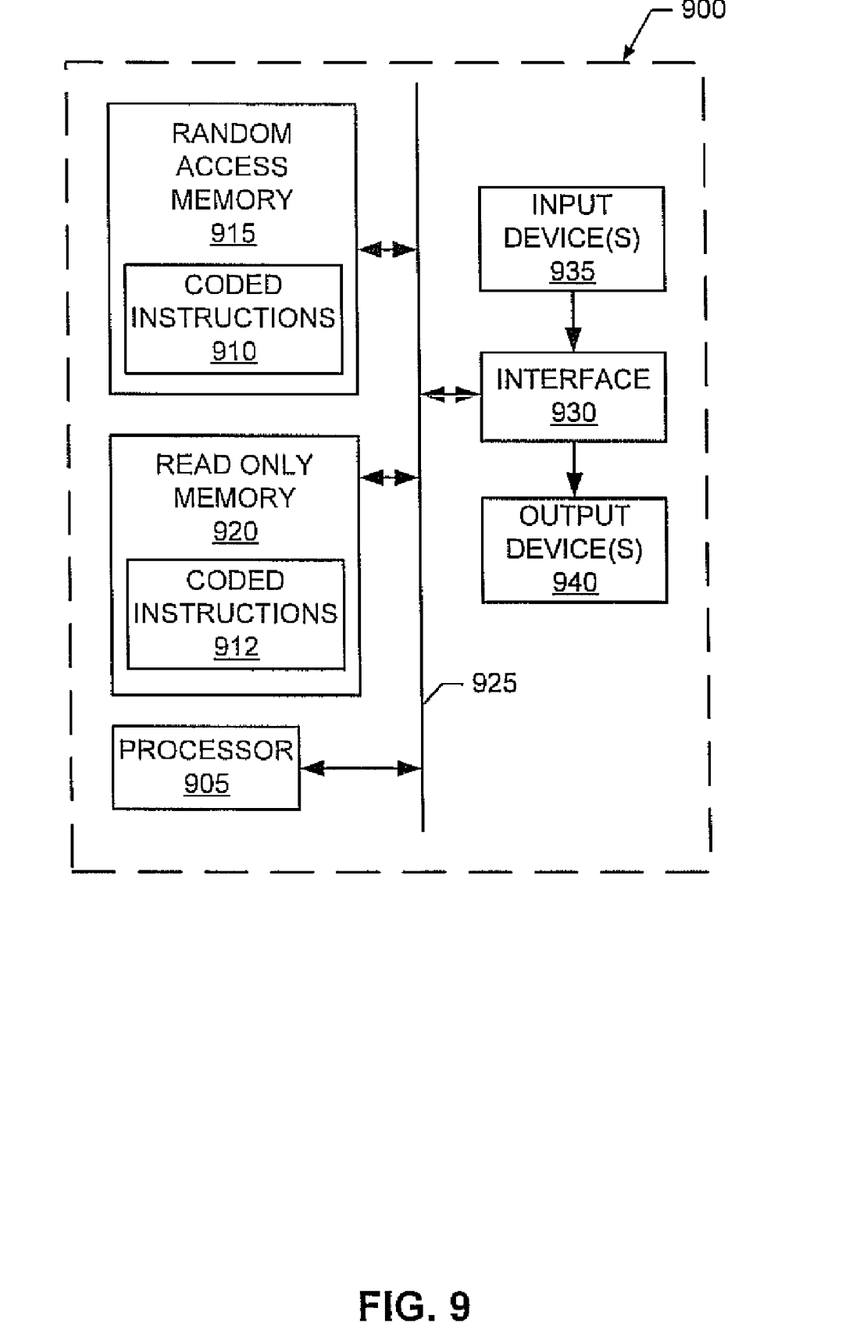
FIG. 9 is a schematic illustration of an example processor platform that may be used and/or programmed to carry out the example fax routing and/or the example machine accessible instructions of FIG. 8, to implement any of all of the example methods and apparatus described herein.

FIG. 9 is a schematic diagram of an example processor platform 900 that may be used and/or programmed to implement all or a portion of any or all of the example ENUM server 202, P-CSCF servers 206 and 208, S-CSCF server 212, I-CSCF server 214, HSS 216, media gateway 220, MGCF 222, fax control server 224, and/or, more generally, the example IMS network 102 of FIGS. 1-3. For example, the processor platform 800 can be implemented by one or more general purpose processors, processor cores, microcontrollers, etc.

The processor platform 900 of the example of FIG. 9 includes at least one general purpose programmable processor 905. The processor 905 executes coded instructions 910 and/or 912 present in main memory of the processor 905 (e.g., within a RAM 915 and/or a ROM 920). The processor 905 may be any type of processing unit, such as a processor core, a processor and/or a microcontroller. The processor 905 may execute, among other things, the example exchanges and/or the example machine accessible instructions of FIG. 8 to implement the example methods and apparatus described herein.

The processor 905 is in communication with the main memory (including a ROM 920 and/or the RAM 915) via a bus 925. The RAM 915 may be implemented by DRAM, SDRAM, and/or any other type of RAM device, and ROM may be implemented by flash memory and/or any other desired type of memory device. Access to the memory 915 and 920 may be controlled by a memory controller (not shown). The RAM 915 may be used to store and/or implement, for example, the example SDP flag library 312, the example SDP table 500, the example ENUM database 204, and/or the example HSS data 216.

The processor platform 900 also includes an interface circuit 930. The interface circuit 930 may be implemented by any type of interface standard, such as an external memory interface, serial port, general purpose input/output, etc. One or more input devices 935 and one or more output devices 940 are connected to the interface circuit 930.

Of course, persons of ordinary skill in the art will recognize that the order, size, and proportions of the memory illustrated in the example systems may vary. Additionally, although this patent discloses example systems including, among other components, software or firmware executed on hardware, it will be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, persons of ordinary skill in the art will readily appreciate that the above described examples are not the only way to implement such systems.

At least some of the above described example methods and/or apparatus are implemented by one or more software and/or firmware programs running on a computer processor. However, dedicated hardware implementations including, but not limited to, an ASIC, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

It should also be noted that the example software and/or firmware implementations described herein are optionally stored on a tangible storage medium, such as: a magnetic medium (e.g., a disk or tape); a magneto-optical or optical medium such as a disk; or a solid state medium such as a memory card or other package that houses one or more read-only (non-volatile) memories, random access memories, or other re-writable (volatile) memories; or a signal containing computer instructions. A digital file attachment to e-mail or other self-contained information archive or set of archives is considered a distribution medium equivalent to a tangible storage medium. Accordingly, the example software and/or firmware described herein can be stored on a tangible storage medium or distribution medium such as those described above or equivalents and successor media.

To the extent the above specification describes example components and functions with reference to particular devices, standards and/or protocols, it is understood that the teachings of the invention are not limited to such devices, standards and/or protocols. Such systems are periodically superseded by faster or more efficient systems having the same general purpose. Accordingly, replacement devices, standards and/or protocols having the same general functions are equivalents which are intended to be included within the scope of the accompanying claims.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under of doctrine of equivalents.

What is claimed is:

1. A method comprising:
   receiving a message at a processor of an Internet protocol (IP) multimedia subsystem (IMS) network, the message comprising a called party number and a media description;
   determining, with the processor, if the media description is associated with a fax protocol; and
   when the media description is associated with the fax protocol, attempting to locate a fax-specific uniform resource identifier (URI) associated with the called party number.

2. A method as defined in claim 1, wherein determining if the media description is associated with the fax protocol further comprises determining if the media description comprises a session description protocol payload.

3. A method as defined in claim 2, further comprising parsing the media description for at least one of a caller identifier, a destination identifier, a fax identifier, or the fax-specific URI.

4. A method as defined in claim 2, further comprising querying a home subscriber server (HSS) for at least one of a routing instruction or the fax-specific URI, the fax-specific URI associated with a subscriber profile.

5. A method as defined in claim 4, wherein the subscriber profile includes a URI associated with at least one of an analog fax machine, an IP fax machine, a fax-to-email system, or a unified messaging (UM) platform.

6. A method as defined in claim 5, wherein the UM platform comprises at least one of an analog fax machine, an IP fax machine, a fax-to-email system, or a voicemail system.

7. A method as defined in claim 1, further comprising querying a tElephone NUMber (ENUM) database to locate the fax-specific URI.

8. A method as defined in claim 1, further comprising directing a fax call associated with the fax protocol to the fax-specific URI.

9. A method as defined in claim 8, further comprising routing the fax call to a unified messaging (UM) platform as at least one of an e-mail message, a voicemail message, or a fax transmission.

10. A method as defined in claim 9, wherein if the fax call is routed to the UM platform as the e-mail message, further comprising routing the fax call to a media gateway to convert the fax call to the e-mail message.

11. A method as defined in claim 1, further comprising a home subscriber server (HSS) to associate a user profile with the URI.

12. A method as defined in claim 11, wherein the HSS associates the URI with a unified messaging platform.

13. An Internet protocol (IP) multimedia subsystem (IMS) fax server comprising:
- a session initiation protocol (SIP) parser to parse a received call for at least one fax identifier;
- a session description protocol (SDP) flag library, the SIP parser to extract at least one SDP flag from the received call associated with the SDP flag library;
- a query engine to attempt to locate a fax-specific uniform resource identifier (URI) associated with the fax identifier; and
- a fax director to route the received call to the fax-specific URI.

14. An IMS fax server as defined in claim 13, wherein the query engine attempts to locate the URI in at least one of a home subscriber server or a tElephone NUMber (ENUM) database.

15. An IMS fax server as defined in claim 13, wherein the at least one SDP flag comprises a session origin, a session name, a session description, an e-mail address, or a URI.

16. An IMS fax server as defined in claim 13, wherein the at least one SDP flag comprises information indicative of a fax transmission.

17. An Internet protocol (IP) multimedia subsystem (IMS) fax server, comprising:
- a session initiation protocol (SIP) parser to parse a received call for at least one fax identifier;
- a query engine to attempt to locate a fax-specific uniform resource identifier (URI) associated with the fax identifier, wherein the query engine comprises a home subscriber server (HSS) querier to query an HSS for a subscriber profile associated with the at least one fax identifier; and
- a fax director to route the received call to the fax-specific URI.

18. An IMS fax server as defined in claim 17, wherein the query engine comprises a tElephone NUMber (ENUM) server querier to query an ENUM server for the fax-specific URI when the HSS does not contain a subscriber profile.

19. An IMS fax server as defined in claim 18, wherein the fax director is to route the received call to the fax-specific URI received from at least one of the HSS or the ENUM server.

20. An IMS fax server as defined in claim 19, wherein the fax director is to route the received call to a media gateway when the fax is to be transmitted as at least one of an e-mail message or a voicemail message.

21. An IMS fax server as defined in claim 17, wherein the subscriber profile is identified via a destination identifier in a session description protocol (SDP) payload of the received call.

22. A tangible article of manufacture storing machine readable instructions which, when executed, cause a machine to, at least:
- determine if a media description in a message comprising a called party number and the media description is associated with a fax protocol; and
- when the media description is associated with the fax protocol, attempt to locate a fax-specific uniform resource identifier (URI) associated with the called party number.

23. An article of manufacture as defined in claim 22, wherein the machine readable instructions further cause the machine to determine if the media description comprises a session description protocol (SDP) payload.

24. An article of manufacture as defined in claim 22, wherein the machine readable instructions further cause the machine to direct a fax call associated with the fax protocol to the fax-specific URI.

* * * * *